US012805447B2

(12) United States Patent
Choudhary et al.

(10) Patent No.: US 12,805,447 B2
(45) Date of Patent: Nov. 24, 2026

(54) STRAW CHOPPER FOR COMBINE HARVESTER

(71) Applicant: CNH Industrial America LLC, New Holland, PA (US)

(72) Inventors: Shubham Choudhary, Ghaziabad (IN); Cooper Linde, Lancaster, PA (US); Nathan E. Isaac, Lancaster, PA (US); Garrett Fjeld, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 301 days.

(21) Appl. No.: 18/632,999

(22) Filed: Apr. 11, 2024

(65) Prior Publication Data

US 2024/0341238 A1 Oct. 17, 2024

Related U.S. Application Data

(60) Provisional application No. 63/459,066, filed on Apr. 13, 2023.

(51) Int. Cl.

*A01F 12/40* (2006.01)
*A01D 90/04* (2006.01)
*A01F 29/04* (2006.01)
*A01F 29/16* (2006.01)

(52) U.S. Cl.

CPC .............. *A01F 12/40* (2013.01); *A01D 90/04* (2013.01); *A01F 29/04* (2013.01); *A01F 29/16* (2013.01)

(58) Field of Classification Search

CPC .......... A01F 12/40; A01F 29/02; A01F 29/04; A01F 29/16; A01F 29/095; A01D 90/04
See application file for complete search history.

(56) References Cited

U.S. PATENT DOCUMENTS

| | | | | |
|---|---|---|---|---|
| 7,484,350 | B2 | 2/2009 | Benes | |
| 7,677,965 | B2 | 3/2010 | Farley | |
| 8,141,805 | B1 | 3/2012 | Isaac | |
| 10,588,261 | B2 | 3/2020 | Dilts | |
| 2008/0305842 | A1 | 12/2008 | Benes et al. | |
| 2014/0179383 | A1 | 6/2014 | Isaac et al. | |
| 2014/0326815 | A1 * | 11/2014 | Dilts | A01F 12/40 241/238 |
| 2017/0099771 | A1 * | 4/2017 | Linde | A01F 29/095 |
| 2022/0132742 | A1 * | 5/2022 | Faulkner | A01F 29/095 460/112 |
| 2022/0361412 | A1 | 11/2022 | Duquesne | |

FOREIGN PATENT DOCUMENTS

| | | | |
|---|---|---|---|
| EP | 2055175 | A1 | 5/2009 |
| EP | 2798943 | A1 | 11/2014 |
| EP | 3172959 | B1 | 9/2018 |

OTHER PUBLICATIONS

Extended European Search Report for European Application No. 24167760.8, dated Aug. 22, 2024 (Aug. 22, 2024)—8 pages.

* cited by examiner

*Primary Examiner* — Robert E Pezzuto
(74) *Attorney, Agent, or Firm* — CM Law PLLC; Stephen J. Weed

(57) ABSTRACT

A residue counterknife assembly comprising: a blade mount configured to secure to a blade shaft having a rotation axis; one or more blades secured to the blade mount and extending away from the rotation axis; and at least one blocking surface comprising an at least semicircular outer face located concentric to and at least partially surrounding the rotation axis.

19 Claims, 8 Drawing Sheets

FIG. 3
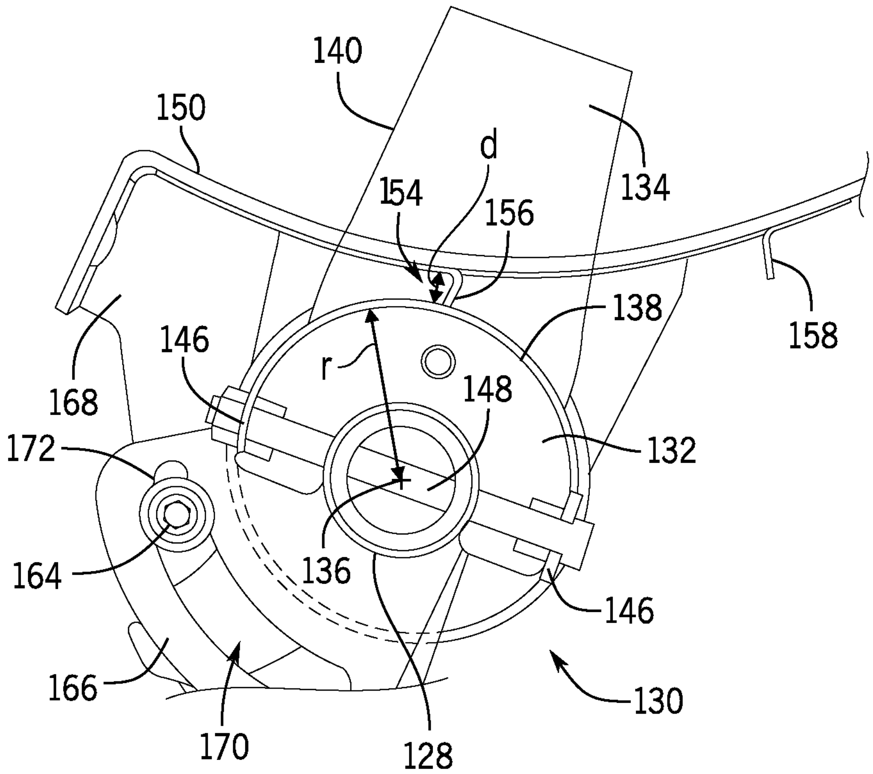
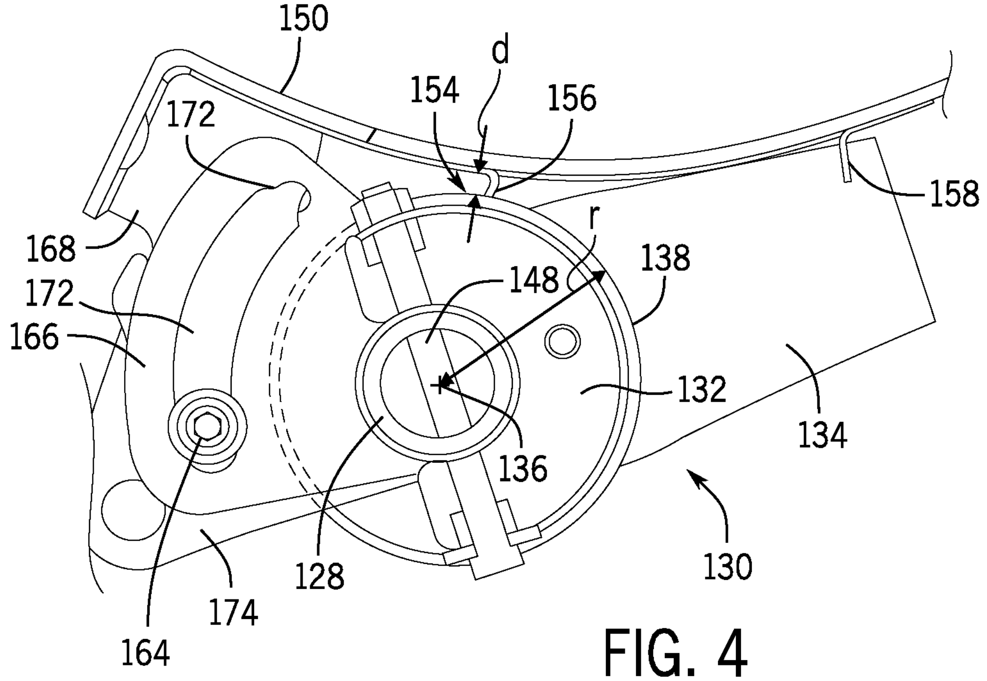
FIG. 4

STRAW CHOPPER FOR COMBINE HARVESTER

BACKGROUND OF THE INVENTION

Agricultural machines, such as combine harvesters, typically process crop material, and deposit a portion of the material on the ground behind the machine. As the purpose of the harvester is to collect grain, the material that is deposited is primarily material other than grain ("MoG"), such as chaff and stalks. This is commonly called "residue." It is generally desirable to minimize the size of the residue pieces, and to spread the residue evenly across the path of the machine. For this purpose, the machine may include a chopper to reduce the residue size, and a spreader to distribute the residue.

The chopper typically comprises a series of knives that rotate on a shaft and are partially enclosed by a shroud. The residue enters the shroud, and the knives strike and cut the residue. A typical chopper also has counterknives that extend radially towards the shaft, and between adjacent pairs of the rotating knives. The counterknives face towards the incoming stream of residue, and provide additional cutting edges. The counterknives can be mounted on their own shaft or on a support that can be moved to extend and retract the counterknives.

The counterknives enter the chopper housing through slots, and residue can enter these slots. As the residue accumulates, it can inhibit the movement and operation of the counterknives. The inventors have found that further improvements to counterknives can benefit the art.

This description of the background is provided to assist with an understanding of the following explanations of exemplary embodiments, and is not an admission that any or all of this background information is necessarily prior art.

SUMMARY OF THE INVENTION

In one exemplary aspect, there is provided a residue counterknife assembly comprising: a blade mount configured to secure to a blade shaft having a rotation axis; one or more blades secured to the blade mount and extending away from the rotation axis; and at least one blocking surface comprising an at least semicircular outer face located concentric to and at least partially surrounding the rotation axis.

In another exemplary aspect, there is provided a residue counterknife system for use on an agricultural harvester. The residue counterknife system comprises: a blade shaft extending along a blade shaft direction; a chopper pan extending parallel to the blade shaft direction and comprising a plurality of blade slots spaced along the blade shaft direction; at least two blade shaft supports spaced apart along the blade shaft direction, wherein the at least two blade shaft supports are configured to rotatably support the blade shaft to rotate about a rotation axis that is parallel to the blade shaft direction, through a range of motion between an extended position and a retracted position; and a plurality of counterknife assemblies attached to the blade shaft along the blade shaft direction. Each counterknife assembly comprises: a blade mount, one or more blades secured to the blade mount and extending away from the rotation axis, wherein each blade is positioned to extend through a respective one of the blade slots at least when the blade shaft is in the extended position, and at least one blocking surface comprising an at least semicircular outer face located concentric to and at least partially surrounding the rotation axis, wherein a portion of the blocking surface passes through a respective predetermined point relative to a respective one of the blade slots throughout the range of motion of the blade shaft between the extended position and the retracted position.

In another exemplary aspect, there is provided an agricultural harvester machine comprising: a chassis configured for movement on a surface; and a residue chopper comprising: a housing defining a cutting chamber, a cutting knife assembly mounted in the cutting chamber to rotate about a cutting knife rotation axis, a blade shaft located outside the housing and extending along a blade shaft direction that is parallel to the cutting knife rotation axis, a chopper pan extending parallel to the blade shaft direction and defining a portion of the housing defining the cutting chamber, the chopper pan comprising a plurality of blade slots spaced along the blade shaft direction, at least two blade shaft supports spaced apart along the blade shaft direction, wherein the at least two blade shaft supports are configured to rotatably support the blade shaft to the chopper pan to rotate about a rotation axis that is parallel to the blade shaft direction, through a range of motion between an extended position and a retracted position, an actuator configured to move the blade shaft through the range of motion between an extended position and a retracted position, and a plurality of counterknife assemblies attached to the blade shaft along the blade shaft direction. Each counterknife assembly comprises: a blade mount, one or more blades secured to the blade mount and extending away from the rotation axis, wherein each blade is positioned to extend through a respective one of the blade slots at least when the blade shaft is in the extended position, and at least one blocking surface comprising an at least semicircular outer face located concentric to and at least partially surrounding the rotation axis, wherein a portion of the blocking surface passes through a respective predetermined point relative to a respective one of the blade slots throughout the range of motion of the blade shaft between the extended position and the retracted position.

BRIEF DESCRIPTION OF THE DRAWINGS

Embodiments of inventions will now be described, strictly by way of example, with reference to the accompanying drawings, in which:

FIG. 3 is a cross-section view of the residue counterknife assembly of FIG. 2 in an extended position.

FIG. 4 is a cross-section view of the residue counterknife assembly of FIG. 2 in a retracted position.

In the figures, like reference numerals refer to the same or similar elements.

DETAILED DESCRIPTION OF THE DRAWINGS

Exemplary embodiments of the present invention provide choppers and counterknives that may be used in agricultural equipment (e.g., combines, windrowers, etc.), or in other environments. However, the invention is not limited to any particular application except as may be specifically recited in the claims.

Figure 1:
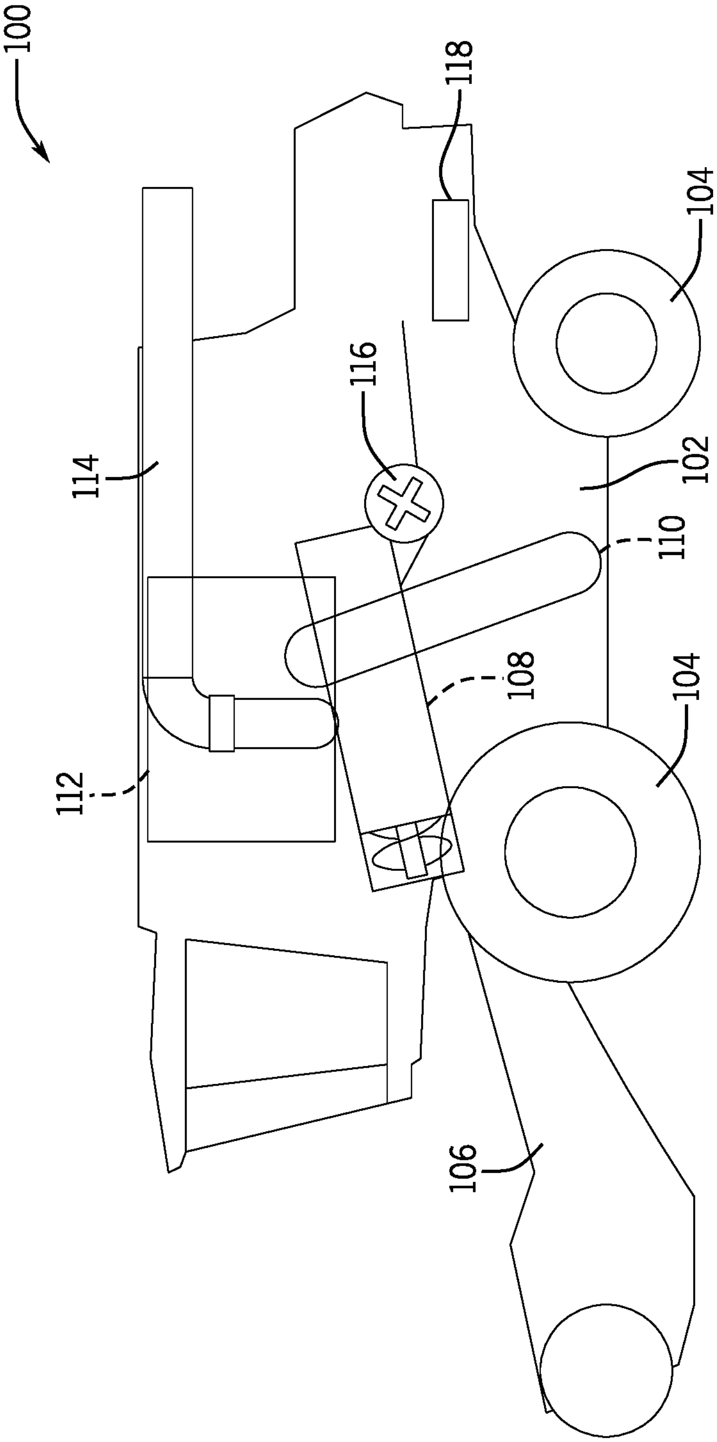
FIG. 1 schematically illustrates a side view of an example of an agricultural combine having residue chopper features such as described herein.

Referring to FIG. 1, an example of an agricultural combine 100 is schematically illustrated. The combine 100 includes a chassis 102 that is supported for movement on the ground by wheels 104 (e.g., pneumatic tires or tracked wheels). A header assembly 106 is attached to the combine 100 and configured to receive crop material and convey such material to a threshing and separating system 108 located in or on the chassis 102. The threshing and separating system 108 separates grain from the remaining crop material (also known as "straw," "material other than grain," "MoG," "crop residue," or simply "residue") and an auger 110 or the like conveys the grain to a grain hopper 112. The threshing and separating system may comprise an axial flow thresher, twin axial flow thresher, crossflow thresher, and so on. An unloader boom 114 may be provided to remove the separated grain as the combine 100 operates.

The residue exits the threshing and separating system 108 and falls into, or is otherwise conveyed to, a crop residue chopper 116, such as those described herein. The residue chopper 116 comminutes the residue, and the residue is then delivered to a spreader 118 that distributes the residue behind the combine 100.

The features described in relation to FIG. 1 are generally conventional, except for the residue chopper 116, and no further explanations of their structures or operations are necessary.

Figure 2:
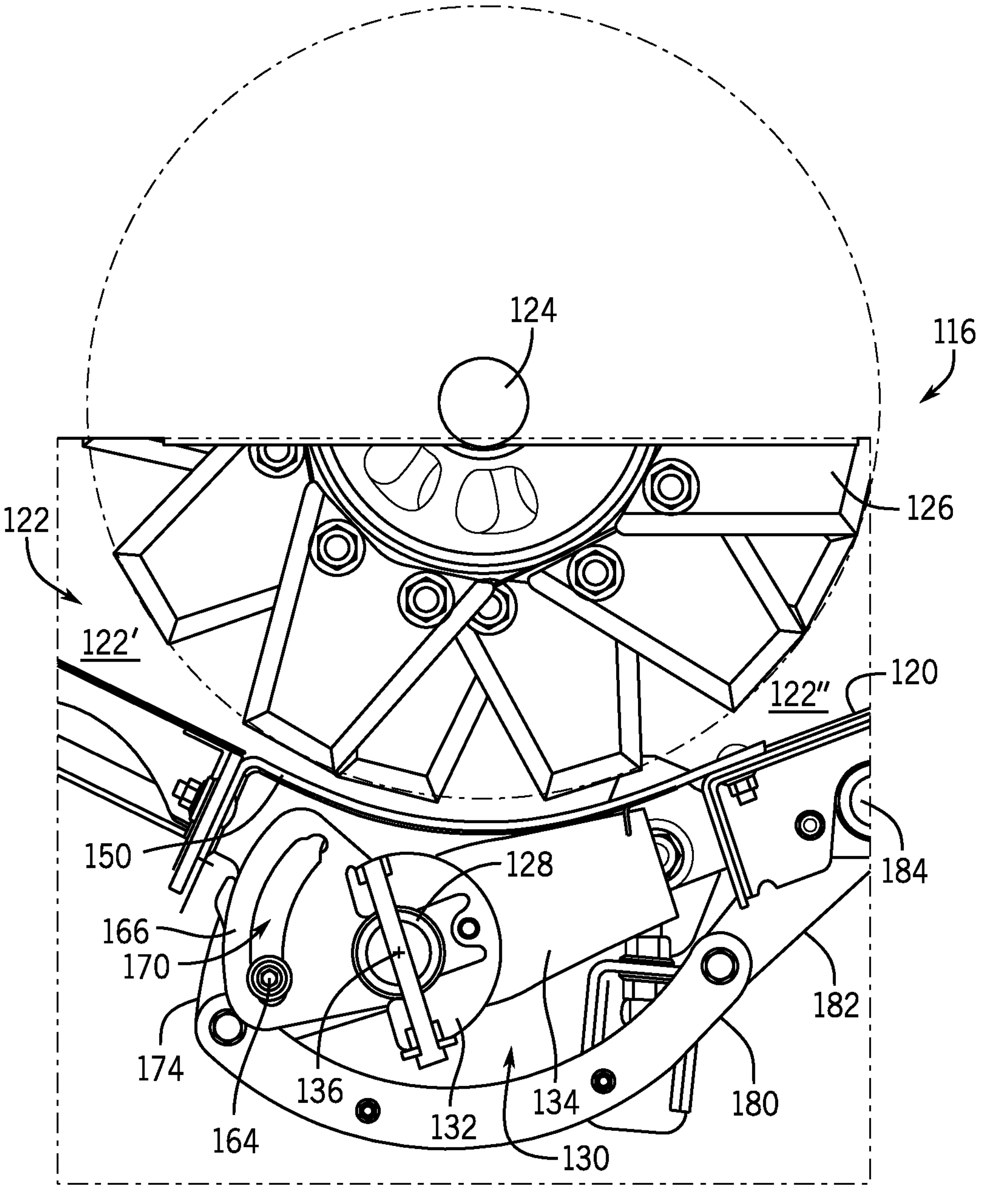
FIG. 2 is a cross-section view of a crop residue chopper having an exemplary embodiment of a residue counterknife assembly.

Details of an exemplary crop residue chopper 116 are shown in more detail in FIGS. 2-4. The crop residue chopper 116 generally includes a housing 120 that defines a cutting chamber 122, a shaft 124 rotatably mounted in the cutting chamber 122, and a plurality of cutting knives 126 mounted on the shaft 124 to rotate within the cutting chamber 122. The cutting knives 126 may be rigidly fixed to the shaft 124 or connected by pivoting links (i.e., flail-type connections). The housing 120 is configured with an infeed opening 122' to direct residue into the path of the cutting knives 126, and an outfeed opening 122" to expel the chopped residue. The housing 120, cutting chamber 122, shaft 124, and cutting knives 126 may have any suitable or conventional construction, as known in the art, and need not be described in further detail herein.

The crop residue chopper 116 also includes a counterknife system comprising a counterknife blade shaft 128 to which counterknife assemblies 130 are attached by one or more bolts, screws, or other fasteners. Each counterknife assembly 130 includes a blade mount 132 having one or more blades 134 mounted thereon. Any number of counterknife assemblies 130 may be attached along the length of the blade shaft 128, and the counterknife assemblies 130 also may be used in conjunction with other types of counterknives or counterknife assemblies not specifically described herein.

FIGS. 3 and 4 show the counterknife system in greater detail. FIG. 3 shows the counterknife system in the extended position, in which the blades 134 extend to the cutting chamber 122. FIG. 4 shows the counterknife system in the retracted position, in which the blades 134 are retracted outside the cutting chamber 122. The counterknife system optionally may be operated at one or more intermediate positions between the extended position and the retracted position. In some cases, the blades 134 may remain at least partially within the cutting chamber 122 when the counterknife system is in the fully-retracted position.

The counterknife blade shaft 128 extends parallel to the cutting knife shaft 124 along a blade shaft direction 136 (which is orthogonal to the page in FIGS. 2-5). In the figures, the blade shaft direction 136 is shown at the axis of rotation of the blade shaft 128, but it will be understood that references herein to a part extending along the blade shaft direction 136 do not require that part to be collinear with the blade shaft rotation axis. The blade shaft 128 may be rotated or otherwise moved by any suitable mechanism, such as a dedicated drive motor or hydraulic actuator, a power takeoff from another powered system, and so on.

Figure 5:
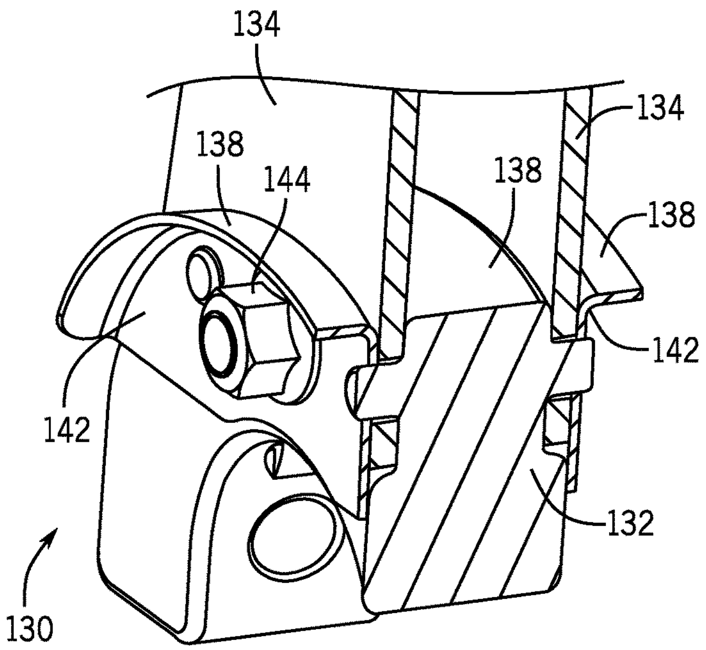
FIG. 5 is an isometric cross-section view of an exemplary counterknife assembly.

Referring now more specifically to FIGS. 3-5, an exemplary counterknife assembly 130 is shown and described in greater detail. As noted above, the counterknife assembly 130 has a blade mount 132 that is removably secured to the blade shaft 128, and one or more blades 134 that extend away from the axis of rotation of the blade shaft 128. The blades 134 may be removably mounted to the blade mount, and may be reversible to help prolong operation of the chopper before having to replace or resharpen the blade edges. In other cases, the blades 134 may be integrally formed with or permanently attached to the blade mount 132. The blade edges 140 may extend at any desired angle and position relative to the rotation axis. In the shown example, the blade edges 140 are offset from the rotation axis, and configured to interact with the edges of the cutting knives 126 at an angle of about 17 degrees when the counterknife assembly is in the fully-extended positions. Other alternatives and embodiments will be apparent to persons of ordinary skill in the art in view of the present disclosure.

The blade mount 132 has one or more blocking surfaces 138 defined by an outer face (i.e., the side facing away from the blade shaft 128 rotation axis) of the blade mount 132. The blocking surfaces 138 are semicircular, and located concentric to and at least partially surrounding the rotation axis of the blade shaft 128. In the shown example, the blade mount 132 has three blocking surfaces 138: a first blocking surface 138 defined as an outer face of the central body of the blade mount 132, and a pair of second blocking surfaces 138 defined as outer faces of debris shields 142 that extend away from the central body of the blade mount 132 in opposite directions along the blade shaft direction 136. The debris shields 142 may be integrally formed with the remainder of the blade mount 132, but in the shown example they are secured as separate parts to the blade mount 132. For example, the debris shields 142 and blades 134 may be secured by one or more fasteners 144 to the blade mount 132.

In other embodiments, there may be a single blade 134 with a blocking surface 138 on one or both sides of the blade 134. In other cases, there may be more than two blades 134 attached to the blade mount 132, with or without a respective blocking surface 138 located between each adjacent pair of blades 134.

In the shown example, the blocking surfaces 138 are semicircular, but in other cases they may define a complete circle around the blade shaft 128. The semicircular blocking surfaces 138 also may be provided in conjunction with non-circular portions of the outer face of the blade mount 132. For example, the blocking surface 138 may terminate at flat portions 146 of the outer face through which a fastener 148 is passed to secure the counterknife assembly 130 to the blade shaft 128.

Figure 6:
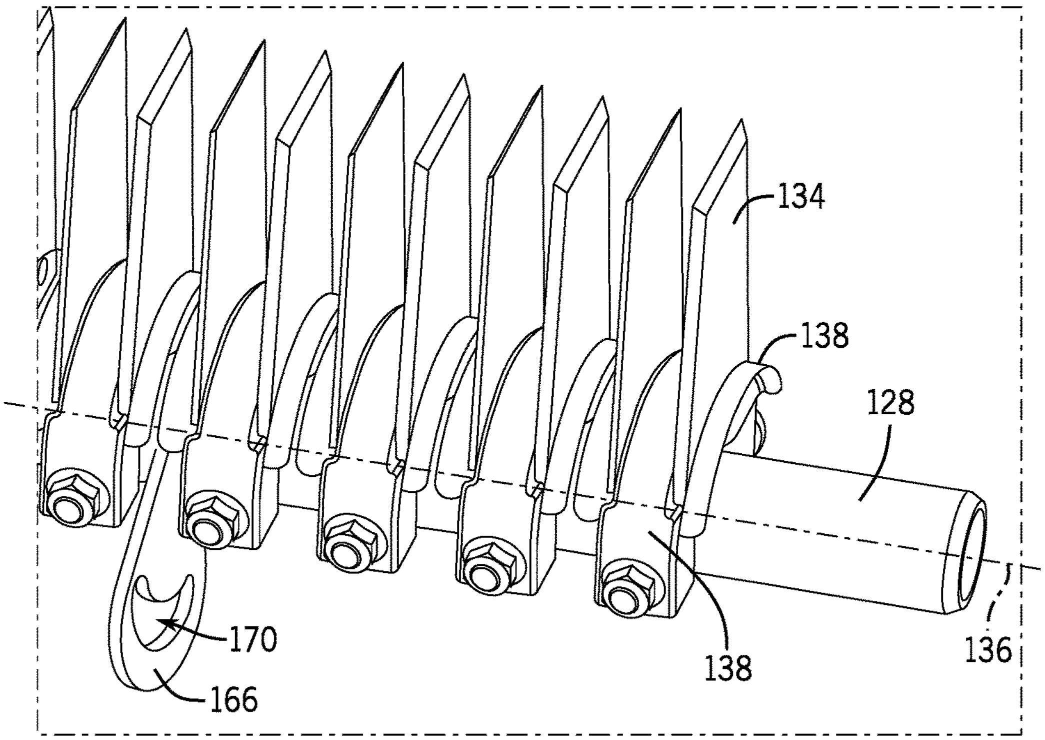
FIG. 6 is an isometric view of an exemplary blade shaft with counterknife assemblies attached to the blade shaft.

Referring to FIG. 6, a number of counterknife assemblies 130 may be mounted next to each other along the blade shaft 128. The blocking surfaces 138 of each adjacent pair of counterknife assemblies 130 may be located in close proximity (e.g., within about 5 millimeters) to each other, such that the blocking surfaces 138 of the counterknife assemblies 130 form a collective blocking surface extending along the blade shaft direction 136.

As best shown in FIGS. 3 and 4, the blocking surfaces 138 are located in relatively close proximity to the chopper housing 120, and more specifically to a portion of the chopper housing 120 defined by a chopper pan 150. The chopper pan 150 has slots 152 (see FIG. 8) through which the blades 134 pass as the blade shaft 128 is rotated between the retracted position and the extended position. As noted above, the blocking surfaces 138 are at least semicircular, and are concentric with the rotation axis of the blade shaft 128. Thus, as the blade shaft 128 and counterknife assemblies 130 turn about the rotation axis, a portion of each blocking surface 138 follows a path through a respective predetermined point 154 relative to a respective one of the blade slots 152 throughout the range of motion of the blade shaft 128 between the extended position and the retracted position. In the drawings, this predetermined point 154 corresponds to a fixed minimum distance d from the blocking surface 138 to the chopper pan 150.

As a result of this construction, the blocking surfaces 138 are positioned to help inhibit residue from passing through the slots 152 throughout the range of motion of the blade shaft 128 and counterknife assemblies 130. It is expected that minimizing the minimum distance d will improve the ability of the blocking surfaces 138 to inhibit residue passage. The lowest value for the minimum distance d may be set as the minimum distance to avoid contact between the parts as they deflect during operation, and/or as a distance necessary to avoid contact due to variations in manufacturing tolerances.

It is also contemplated that the ability of the blocking surfaces 138 to inhibit residue from passing through the slots 152 can be affected by the radius r of the blocking surfaces 138. For example, increasing the radius r will decrease the distance of the blocking surface 138 from the chopper pan 150 at locations on either side of the point of minimum distance d, thus improving residue blockage further along the slot 152. Other alternatives and embodiments will be apparent to persons of ordinary skill in the art in view of the present disclosure.

In the shown examples, the blocking surface 138 comprises a smooth semicircular shape, however, it may localized bumps, depressions, ridges or other localized variations in the surface shape to help push residue away as the counterknife assemblies 130 rotate. For example, the blocking surface 138 may include ribs that extend parallel to, perpendicular to, or in a helical pattern relative to the rotation axis. The blocking surface 138 also may include annular walls that extend radially outward to inhibit residue from moving along the blade shaft direction 136. Other alternatives and embodiments will be apparent to persons of ordinary skill in the art in view of the present disclosure.

Figure 7:
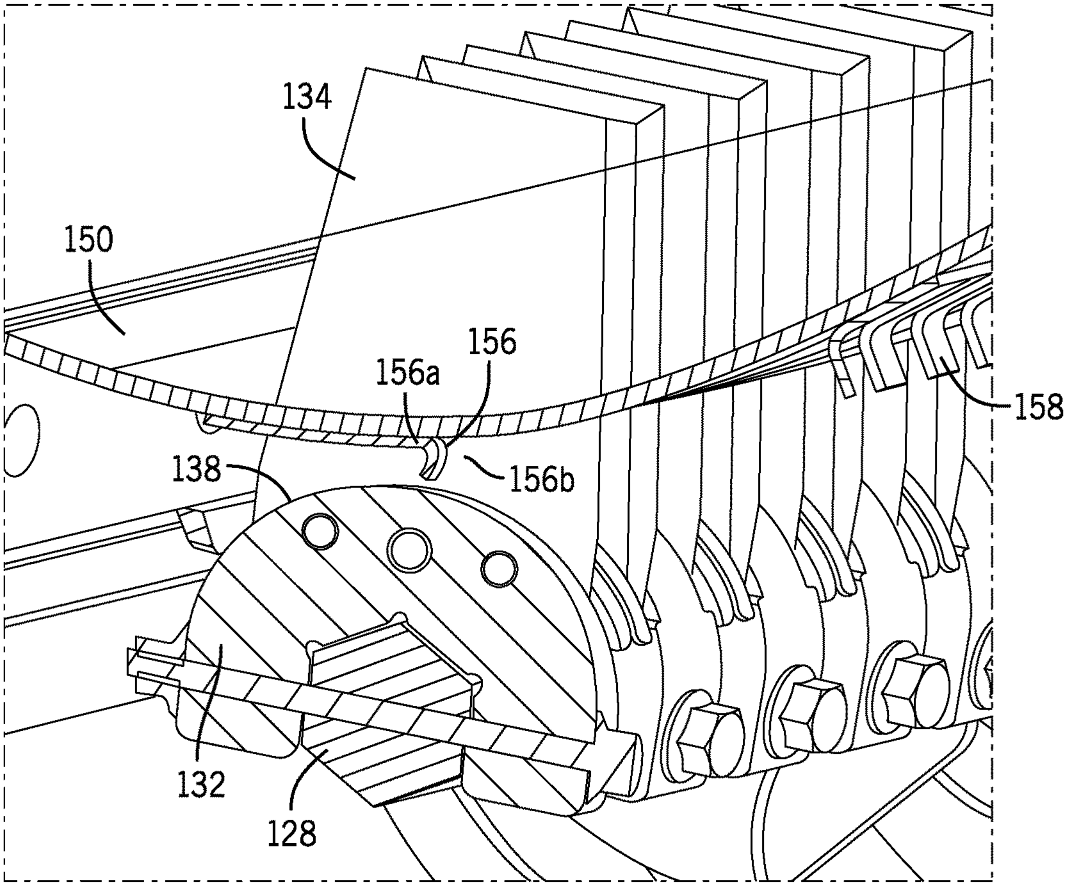
FIG. 7 is an isometric cross-section view of an exemplary blade shaft with counterknife assemblies attached to the blade shaft, and a chopper pan.
Figure 8:
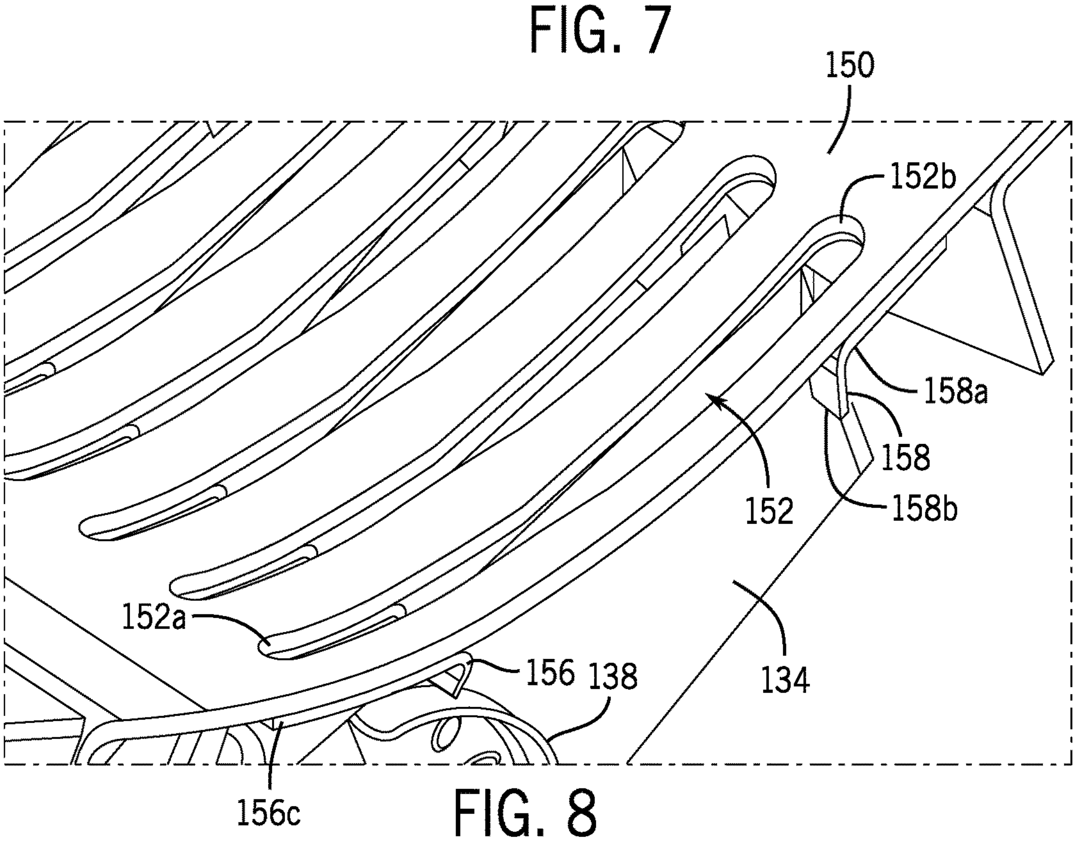
FIG. 8 is an isometric view of the assembly of FIG. 7 shown from a different angle.
Figure 9:
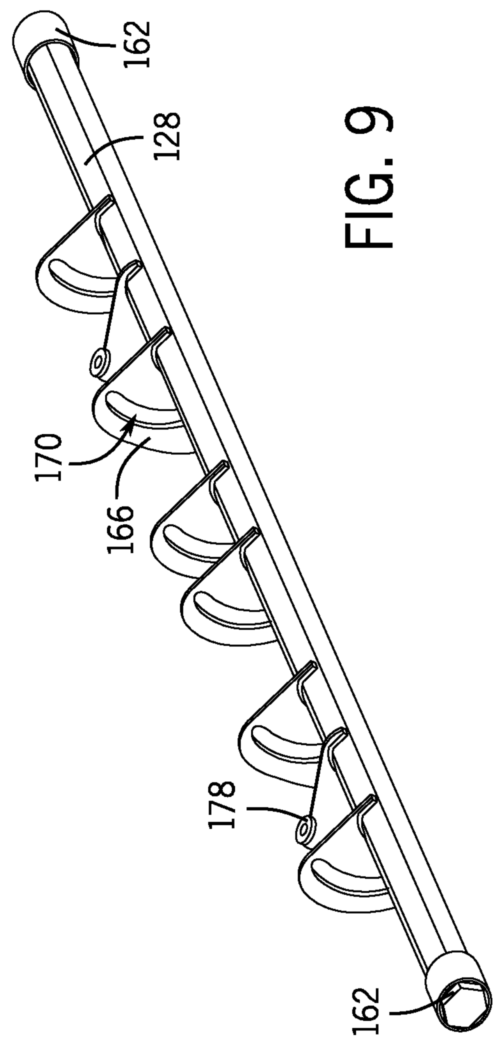
FIG. 9 is an isometric view of an exemplary blade shaft.

Referring now also to FIGS. 7 and 8, while the blocking surfaces 138 are expected to be helpful on their own, embodiments also may include blocking surface scrapers 156 that contact or come close to contacting the blocking surfaces 138 as they move, to help remove any residue that might pass through the slots 152. The blocking surface scrapers 156 may be mounted anywhere where they can clear residue from the blocking surfaces 138. In the shown embodiment, the each blocking surface scraper 156 has a proximal end **156*a* secured to the chopper pan 150, and a distal end 156*b* that is spaced away from the chopper pan 150 and located at the respective predetermined point 154 through which the blocking surface 138 moves as it rotates. The distal end 156*b* may contact the blocking surface 138, but this is not strictly required. In the shown example, the distal end 156*b* is oriented at a non-perpendicular angle relative to the adjacent portion of the blocking surface 138, which may help to drive the residue primarily in one direction to remove it from the blocking surface 138**.

The blocking surface scrapers 156 may be mounted to the chopper pan 150 in any suitable manner. For example, the blocking surface scrapers 156 may be secured to the chopper pan 150 by rivets, bolts, weldments, and so on. The blocking surface scrapers 156 also may be flexible and mounted to bias them into contact with the blocking surface 138, or to be able to flex out of the way of rocks or other debris that might otherwise damage them. In the shown example, the blocking surface scrapers are attached to the chopper pan 150 in the form of cantilevered springs having one or more integral flexible regions. The blocking surface scrapers 156 may be made of any suitable material, such as bent steel sheet or the like.

Although not strictly required, a respective blocking surface scraper 156 may be provided for each blocking surface 138. For convenience, a number of blocking surface scrapers 156 may be formed from a single sheet, with a continuous strip **156*c* of the sheet material extending along the blade shaft direction 136 in front of the leading ends 152*a* of the slots 152, to join the blocking surface scrapers 156 together (see, e.g., FIG. 10**). Other alternatives and embodiments will be apparent to persons of ordinary skill in the art in view of the present disclosure.

Embodiments also may include blade scrapers 158 that are located along the length of each blade 134 and configured to help remove debris from the blades 134 as they move between the extended and retracted positions. For example, blade scrapers may be located just forward of the trailing ends **152*b* of the slots 152 to contact or be in close proximity to the side surfaces of the blades 134. The blade scrapers 158 may have generally the same construction as the blocking surface scrapers 156. For example, each blade scraper 158 may have a proximal end 158*a* secured to the chopper pan 150 and a distal end 158*b* spaced away from the chopper pan 150 and located adjacent to a respective blade 134 when the blade shaft 128 is in the retracted position. The blade scrapers 158 also may comprise any suitable material, and may be joined by a continuous strip of material 158*c* extending in the blade shaft direction 136 behind the slot trailing ends 152*b* (see, e.g., FIG. 10**). Other alternatives and embodiments will be apparent to persons of ordinary skill in the art in view of the present disclosure.

Figure 10:
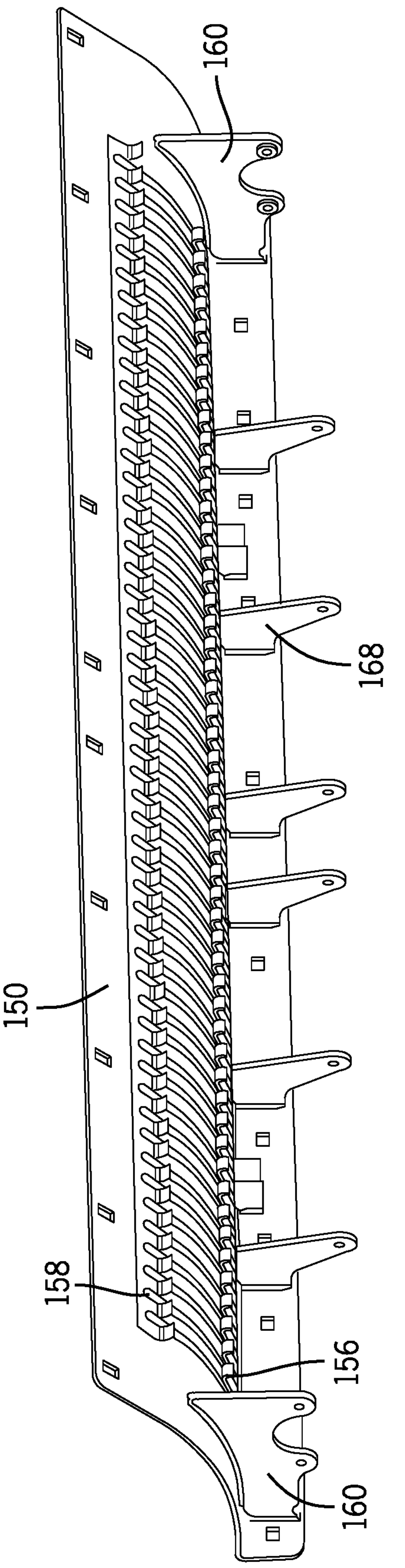
FIG. 10 is an isometric view of an exemplary chopper pan assembly.
Figure 11:
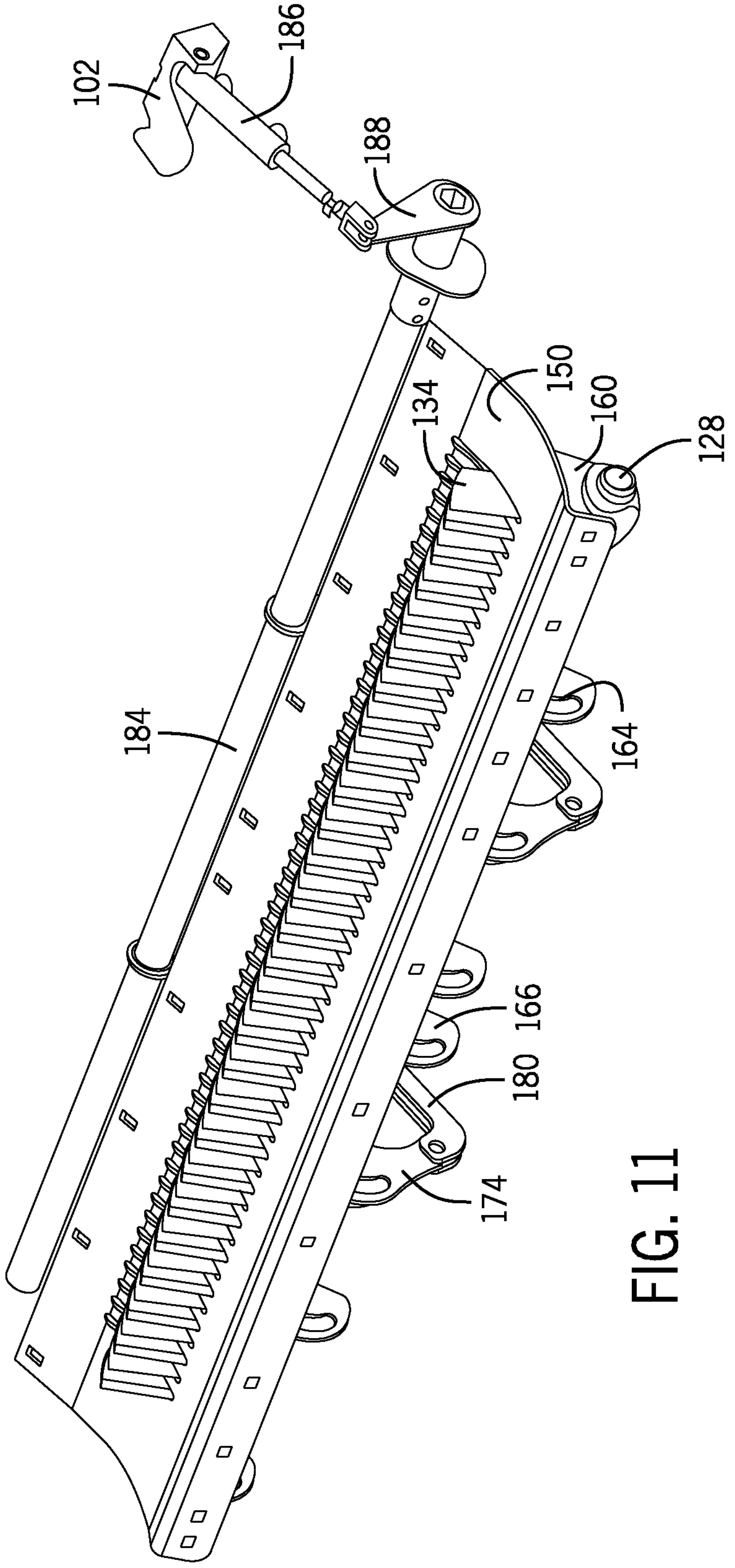
FIG. 11 is an isometric view of an exemplary counterknife system including a drive system.
Figure 12:
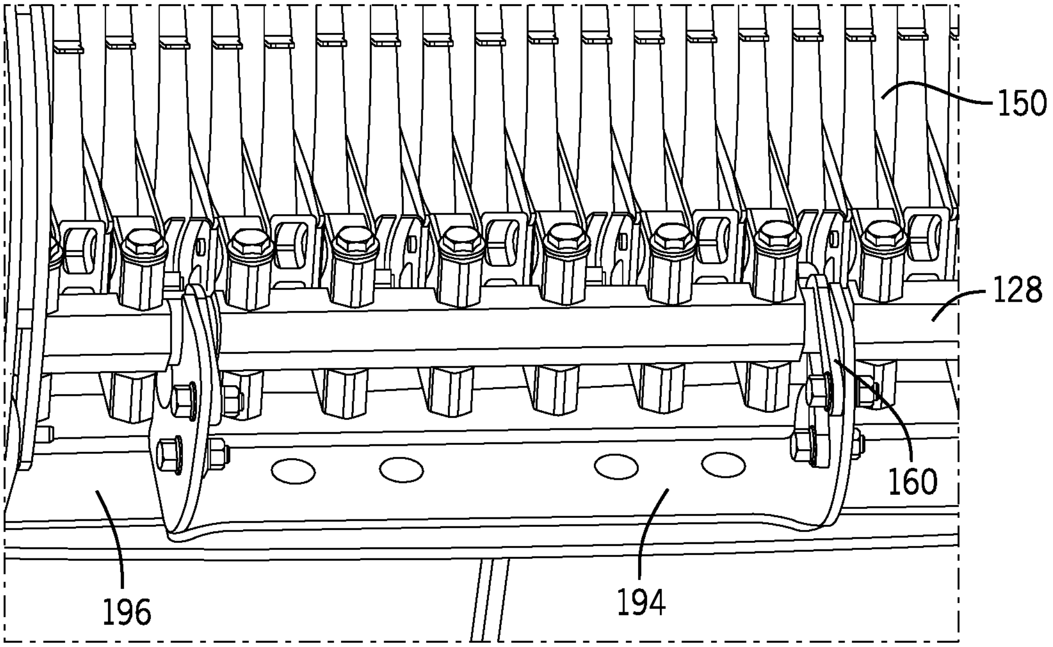
FIGS. 12 and 13 views of a counterknife assembly mounting system.
Figure 13:
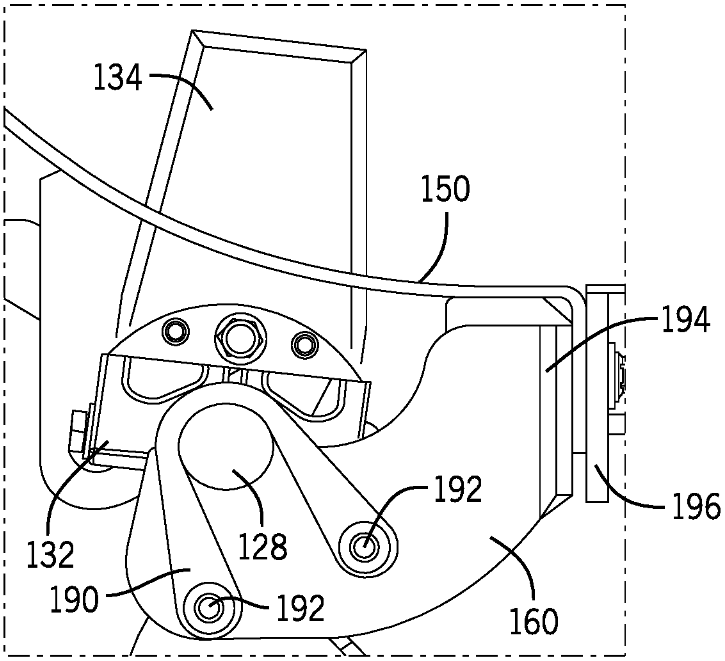

Referring now to FIGS. 1-3 and 9-13, examples of mounting arrangements for the blade shaft 128 are shown and described in detail. The blade shaft 128 is mounted on two or more blade shaft supports 160 by rotating bearings 162, bushings or the like. In the case of FIG. 10, there are two blade shaft supports 160 secured to the chopper pan 150, such as by being welded to the chopper pan 150, with one blade shaft support located at each end of the blade shaft 128. In the embodiment of FIGS. 12 and 13, there are two additional blade shaft supports 160 located at intermediate positions along the blade shaft 128 (in addition to or instead of the ones located at each end, as shown in FIG. 10). In this case, each blade shaft support 160 includes a yoke 190 that wraps around the blade shaft 128, and is secured to the remainder of the blade shaft support 160 by fasteners 192. The blade shaft may include circular regions (if it is not otherwise circular) that provide rotating interfaces with the blade shaft support 160 and its yoke 190, such as shown, but there also may be bearings or bushings interposed to provide a rotating support. As best shown in FIG. 12, two or more blade shaft supports 160 may be joined by a crossbar 194 to form a unitary assembly. In this case, the crossbar 194 is bolted to the chopper pan 150 at a flange 196 that extends away from the cutting chamber 122, but other attachments may be used. In other cases, other numbers of blade supports 160 may be provided, and the blade shaft supports 160 may connect to other structures, such as another part of the chopper assembly or the chassis of the vehicle. Other alternatives and embodiments will be apparent to persons of ordinary skill in the art in view of the present disclosure.

The blade shaft 128 may also include one or more blade shaft guides that help prevent the blade shaft 128 from deflecting. In this example, each blade shaft guide comprises two main components: a guide pin 164 (best shown in FIGS. 1-3) and a guide plate 166. Each guide pin 164 extends along the blade shaft direction 136, and is secured to the chopper pan 150 by a pin support 168. Each guide plate 166 is secured to the blade shaft 128, and extends in a plane orthogonal to the blade shaft direction 136. Each guide plate 166 includes a semicircular slot 170 that is concentric to the rotation axis of the blade shaft 128.

Each pin 164 is captured in the a respective slot 170 with respect to motion along the blade shaft direction 136. For example, each guide pin 164 may comprise a threaded rod having nuts or washers located on each side of the guide plate 166 to prevent the guide pin 164 from moving relative to the guide plate 166 along the blade shaft direction 136. Each slot 170 is long enough to allow the blade shaft 128 to rotate through its full range of motion between the retracted position to the extended position. The slots 170 also may include a void 172, extending from one or both ends of the slot 170 and outside the guide pin's 164 travel path, to provide an escape path for residue that might be pushed along the slot 170 by the guide pin 176. The void 172 may, for example, comprise a narrowed extension of the slot 170 that is too small for the guide pin 164 to enter, or simply a portion of the slot 170 into which the guide pin 164 cannot travel due to other constraints on the motion of the parts.

In use, the guide pins 164 and guide plates 166 interact to allow the blade shaft 128 to rotate, but inhibit the blade shaft from flexing out of parallel with the blade shaft direction 136. It will be understood that the foregoing embodiment may be modified in various ways, such as by mounting the guide pin 164 to the blade shaft 128, and mounting the guide plate 166 to the chopper pan 150. Other alternatives and embodiments will be apparent to persons of ordinary skill in the art in view of the present disclosure.

The blade shaft 128 also may include one or more lever arms 174 by which the blade shaft 128 can be rotated. In the shown example, there are two lever arms 174, and these are formed integrally with respective guide plates 166. In other cases there may be more or fewer lever arms 174, and they need not be integral with guide plates 166. It is also contemplated that the blade shaft 128 may be rotated by lever arms, drive motors or the like, that are located at each end of the blade shaft 128, rather than by lever arms located along the length of the blade shaft 128. The lever arms 174 also may be replaced by gears, chain sprockets, or other suitable drive linkages. The bladed shaft 128 also may include fixed or adjustable travel stops 178 that control the rotational range of movement of the blade shaft 128 by contacting nearby objects at the end of the desired travel range.

The blade shaft 128 may be operated by any suitable linkage of force transferring members. In this example, the lever arms 174 are connected to links 180 that extend to drive levers 182 mounted to the chopper pan 150 or to any other suitable structure, such as the vehicle chassis 102. The drive levers 182 are secured to a common rotatable drive shaft 184, so that the drive levers 182 rotate in unison about the drive shaft's rotation axis, which preferably is parallel to the blade shaft direction 136. The drive shaft 184 is rotated about its axis by an actuator 186, such as a hydraulic piston and cylinder assembly that is secured to the drive shaft 184 by a dedicated drive lever 188 or by one of the other drive levers 182. The actuator 186 is secured at its other end to the vehicle 102 or some other fixed object. Any suitable drive system, such as a conventional pressurized hydraulic system, may be used to operate the actuator 186.

It will appreciated that embodiments may be provided to the market in various states of assembly. For example, one embodiment may be provided as a counterknife assembly having a blocking surface as described herein, which may be provided with or without blades and fasteners. Another embodiment may be provided as an assembly of a blade shaft having counterknife assemblies. Another embodiment may be provided as a counterknife system having a blade shaft, counterknife assemblies, a chopper pan, and other parts, which can be installed in an existing harvester. Another embodiment may be provided as a towed agricultural harvester machine having a powered residue chopper with a counterknife system as described herein. Another embodiment may be provided as an self-propelled agricultural harvester including a threshing and separating system, powered drive wheels, and counterknife system as described herein. Other alternatives and embodiments will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

It will also be understood that the description herein and the claims describe features that may be combined with other features not specifically described. For example, a counterknife as described and claimed herein may be used in conjunction with other, conventional counterknives, and so on. Also, features identified in the singular or by a specific number are not intended to be limited to a single features or the described number of features unless specifically recited as being present only in the specified quantity.

The invention claimed is:

1. A residue counterknife assembly comprising:

a blade mount configured to secure to a blade shaft having a rotation axis;

one or more blades secured to the blade mount and extending away from the rotation axis; and at least one blocking surface comprising an at least semicircular outer face located concentric to and at least partially surrounding the rotation axis, wherein the at least one blocking surface comprises a respective outer face of a first debris shield and a respective outer face of a second debris shield, wherein the one or more blades are positioned, with respect to the rotation axis, between the respective outer face of the first debris shield and the respective outer face of the second debris shield.

2. The residue counterknife assembly of claim 1, wherein the one or more blades are removably mounted to the blade mount.

3. The residue counterknife assembly of claim 1, wherein the at least one blocking surface comprises an outer face of the blade mount.

4. The residue counterknife assembly of claim 3, wherein the outer face of the blade mount is positioned, with respect to the rotation axis, between a first blade secured to the blade mount and a second blade secured to the blade mount.

5. The residue counterknife assembly of claim 1, wherein the at least one blocking surface comprises an outer face of a debris shield removably connected to the blade mount and one or more blades.

6. The residue counterknife assembly of claim 1, wherein the at least one blocking surface comprises:

a respective outer face of a first debris shield;

a respective outer face of a second debris shield; and a respective outer face of the blade mount;

wherein the one or more blades comprises:

a first blade positioned, with respect to the rotation axis, between the respective outer face of the first debris shield and the respective outer face of the blade mount, and a second blade positioned, with respect to the rotation axis, between the respective outer face of the second debris shield and the respective outer face of the blade mount.

7. A residue counterknife system for use on an agricultural harvester, the residue counterknife system comprising:

a blade shaft extending along a blade shaft direction;

a chopper pan extending parallel to the blade shaft direction and comprising a plurality of blade slots spaced along the blade shaft direction;

at least two blade shaft supports spaced apart along the blade shaft direction, wherein the at least two blade shaft supports are configured to rotatably support the blade shaft to rotate about a rotation axis that is parallel to the blade shaft direction, through a range of motion between an extended position and a retracted position; and a plurality of counterknife assemblies attached to the blade shaft along the blade shaft direction, each of the plurality of counterknife assemblies comprising:

a blade mount, one or more blades secured to the blade mount and extending away from the rotation axis, wherein each blade is positioned to extend through a respective one of the blade slots at least when the blade shaft is in the extended position, and at least one blocking surface comprising an at least semicircular outer face located concentric to and at least partially surrounding the rotation axis, wherein a portion of the blocking surface passes through a respective predetermined point relative to a respective one of the blade slots throughout the range of motion of the blade shaft between the extended position and the retracted position.

8. The residue counterknife system of claim 7, wherein the at least one blocking surface comprises an outer face of the blade mount.

9. The residue counterknife system of claim 8, wherein the outer face of the blade mount is positioned, with respect to the rotation axis, between a first blade secured to the blade mount and a second blade secured to the blade mount.

10. The residue counterknife system of claim 7, wherein the at least one blocking surface comprises a respective outer face of a first debris shield and a respective outer face of a second debris shield, wherein the one or more blades are positioned, with respect to the rotation axis, between the respective outer face of the first debris shield and the respective outer face of the second debris shield.

11. The residue counterknife system of claim 7, wherein the at least one blocking surface comprises:

a respective outer face of a first debris shield;

a respective outer face of a second debris shield; and a respective outer face of the blade mount;

wherein the one or more blades comprises:

a first blade positioned, with respect to the rotation axis, between the respective outer face of the first debris shield and the respective outer face of the blade mount, and a second blade positioned, with respect to the rotation axis, between the respective outer face of the second debris shield and the respective outer face of the blade mount.

12. The residue counterknife system of claim 7, wherein the respective blocking surfaces of the plurality of counterknife assemblies form a collective blocking surface extending along the blade shaft direction.

13. The residue counterknife system of claim 7, further comprising a plurality of blocking surface scrapers, each blocking surface scraper having a respective proximal end secured to the chopper pan and a respective distal end spaced away from the chopper pan and located at the respective predetermined point of at least one blocking surface.

14. The residue counterknife system of claim 13, wherein the respective distal end of each blocking surface scraper is positioned to contact the at least semicircular outer face of the at least one respective blocking surface throughout the range of motion of the blade shaft between the extended position and the retracted position.

15. The residue counterknife system of claim 7, further comprising a plurality of blade scrapers, each blade scraper having a respective proximal end secured to the chopper pan and a respective distal end spaced away from the chopper pan and located adjacent to a respective blade when the blade shaft is in the retracted position.

16. The residue counterknife system of claim 7, further comprising one or more blade shaft guides, each blade shaft guide comprising:

a guide pin secured to one of the blade shaft and the chopper pan and extending along the blade shaft direction; and a guide plate secured to the other of the blade shaft and the chopper pan and extending in a plane orthogonal to the blade shaft direction and defining a semicircular slot that is concentric to the rotation axis;

wherein the guide pin is captured in the slot with respect to the blade shaft direction, and movable along the slot throughout the range of motion of the blade shaft between the extended position and the retracted position.

17. The residue counterknife system of claim 16, wherein the guide plate defines at least one void extending from an end of the slot and outside a travel path of the guide pin to provide an escape path for material pushed along the slot by the guide pin.

18. An agricultural harvester machine comprising:

a chassis configured for movement on a surface; and a residue chopper comprising:

a housing defining a cutting chamber, a cutting knife assembly mounted in the cutting chamber to rotate about a cutting knife rotation axis, a blade shaft located outside the housing and extending along a blade shaft direction that is parallel to the cutting knife rotation axis, a chopper pan extending parallel to the blade shaft direction and defining a portion of the housing defining the cutting chamber, the chopper pan comprising a plurality of blade slots spaced along the blade shaft direction, at least two blade shaft supports spaced apart along the blade shaft direction, wherein the at least two blade shaft supports are configured to rotatably support the blade shaft to the chopper pan to rotate about a rotation axis that is parallel to the blade shaft direction, through a range of motion between an extended position and a retracted position, an actuator configured to move the blade shaft through the range of motion between an extended position and a retracted position, and a plurality of counterknife assemblies attached to the blade shaft along the blade shaft direction, each of the plurality of counterknife assemblies comprising:

a blade mount, one or more blades secured to the blade mount and extending away from the rotation axis, wherein each blade is positioned to extend through a respective one of the blade slots at least when the blade shaft is in the extended position, and at least one blocking surface comprising an at least semicircular outer face located concentric to and at least partially surrounding the rotation axis, wherein a portion of the blocking surface passes through a respective predetermined point relative to a respective one of the blade slots throughout the range of motion of the blade shaft between the extended position and the retracted position.

19. The agricultural harvester machine of claim 18, further comprising:

a threshing and separating system attached to the chassis and configured to deliver crop residue to the residue chopper; and powered wheels configured to move the chassis on the surface.

* * * * *